United States Patent [19]

Swenson

[11] 4,394,732
[45] Jul. 19, 1983

[54] CACHE/DISK SUBSYSTEM TRICKLE

[75] Inventor: Robert E. Swenson, Mendota Heights, Minn.

[73] Assignee: Sperry Corporation, New York, N.Y.

[21] Appl. No.: 207,097

[22] Filed: Nov. 14, 1980

[51] Int. Cl.³ .............................................. G06F 13/00
[52] U.S. Cl. .................................... 364/200; 364/900
[58] Field of Search ............................... 364/200, 900

[56] References Cited

U.S. PATENT DOCUMENTS

| 3,569,938 | 3/1971 | Eden et al. | 364/200 |
|---|---|---|---|
| 3,737,881 | 6/1973 | Cordi et al. | 364/900 |
| 3,928,857 | 12/1975 | Carter et al. | 364/200 |
| 4,008,460 | 2/1977 | Bryant et al. | 364/200 |
| 4,075,686 | 2/1978 | Calle et al. | 364/200 |
| 4,168,541 | 9/1979 | Dekarske | 364/200 |
| 4,195,341 | 3/1980 | Joyce et al. | 364/200 |
| 4,314,331 | 2/1982 | Porter et al. | 364/200 |

Primary Examiner—Mark E. Nusbaum
Assistant Examiner—Michael R. Fleming
Attorney, Agent, or Firm—Griffin, Branigan & Butler

[57] ABSTRACT

A cache/disk subsystem includes a storage control unit, a relatively low capacity high speed cache store, and a higher capacity slower memory such as a plurality of disk drive devices. The storage control unit controls the subsystem to transfer from the cache store to the disk drive devices segments of data which have been modified while resident in the cache store and insures that space will be available in the cache store for new data if a particular operation requires that new data be transferred from a disk to the cache store for use. The subsystem may include plural storage control units and any of them may control the transfers of segments of data to the disks.

10 Claims, 9 Drawing Figures

SEGMENT DESCRIPTOR TABLE (SDT)

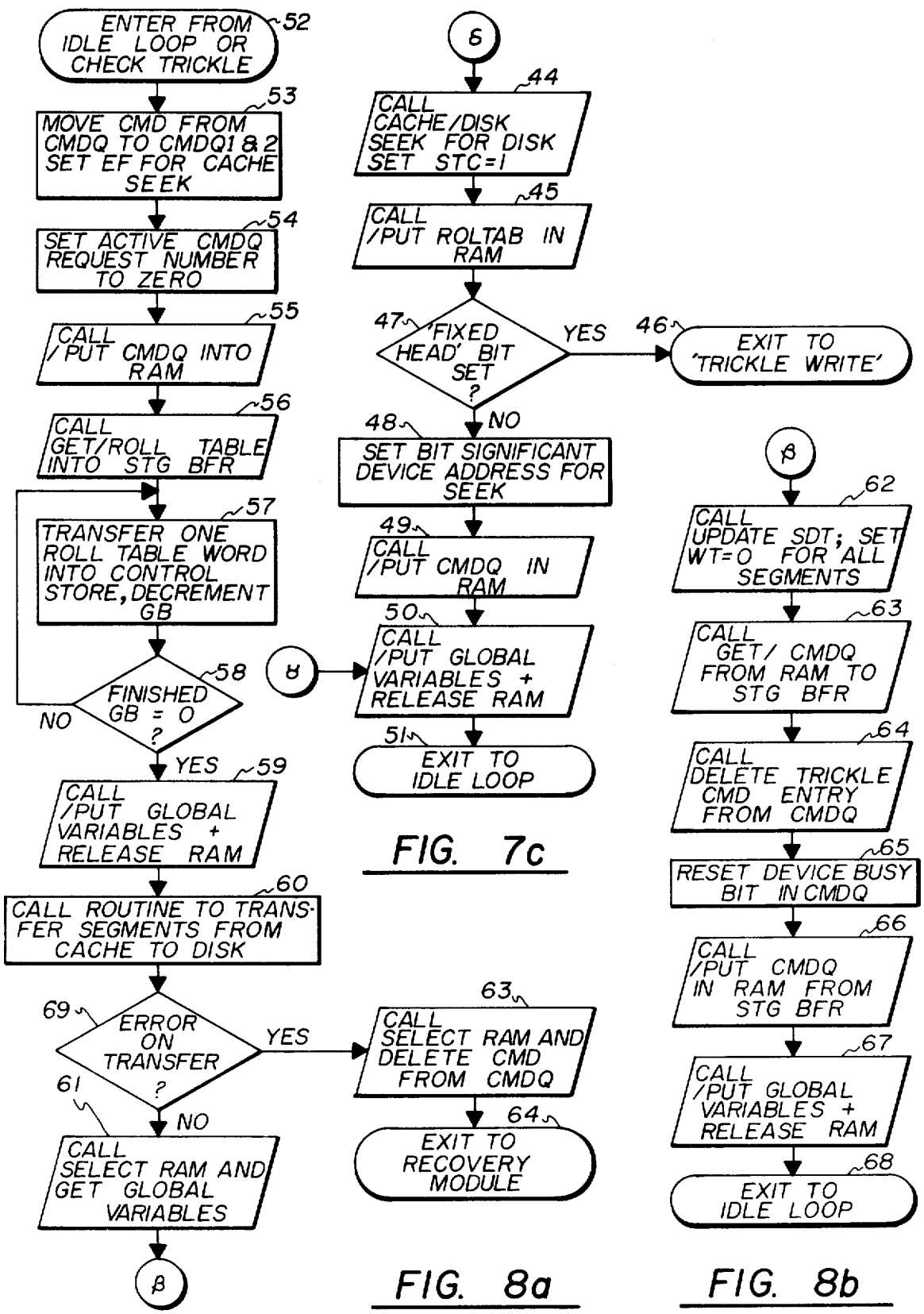

COMMAND QUEUES

CMDQ HEADER -- TWO WORDS

| BITS → | 0 | 1 2 3 | 4 5 6 7 | 8 9 10 | 11 12 13 14 15 | 16 17 18 19 20 21 22 23 | 24 25 26 27 28 29 30 31 ← BITS |
|---|---|---|---|---|---|---|---|
| | DB ES V Y | 0 0 0 | NCQ | 0 0 0 | DEVICE NUMBER | 0 0 0 0 0 0 0 0 | NEXT SEQUENCE NUMBER |
| | | ACTIVE COMMAND REQUEST NUMBER | | | | | |
| | 0 | 0 0 0 0 0 0 0 0 0 0 0 X X X | | | I N V | SEEK IN PROGRESS (SIP) REQUEST NUMBER | |
| | 0 | 0 0 0 0 0 0 0 0 0 0 0 0 0 0 0 | | | | 0 0 0 0 0 0 0 0 0 0 0 0 0 X X X | |

CMDQ ENTRY -- TWO WORDS PER ENTRY

| 0 1 2 3 | 4 | 5 6 7 | 8 9 10 11 12 13 14 15 | 16 17 | 18 19 | 20 21 | 22 23 | 24 25 | 26 27 | 28 29 30 31 | |
|---|---|---|---|---|---|---|---|---|---|---|---|
| HOST ID | F U L | PRIORITY | SEQUENCE NUMBER | S C C Q E | C D E | F L H 2 | F E F | DIAG | A R C W D | R MODE D | T R K | REQ NUMBER | ← CMDQ1 |
| 0 0 | NSEG (TO BE TRANSFERED) | | 0 0 0 0 | SEGMENT DEVICE RELATIVE ADDRESS (SDRA) | | | | | | | ← CMDQ2 |

FIG. 9

CACHE/DISK SUBSYSTEM TRICKLE

RELATED APPLICATIONS

This application is related to the copending application of Robert E. Swenson, Ser. No. 207,152, filed concurrently herewith. The disclosure of that application is incorporated herein by reference.

BACKGROUND OF THE INVENTION

The present invention relates to electronic digital data processing systems of the type including a fast-access lower capacity cache store and a slower-access, larger capacity store such as a plurality of disks. More particularly, the present invention provides a method and apparatus utilizing the post-store method of returning to disks the data which has been modified (written to) while present in the cache store.

The copending application of Robert E. Swenson, Ser. No. 207,152 discloses a digital data processing system wherein one or more host processors are connected through one or more storage control units to a plurality of disk drive devices and a cache store. A host processor issues a command to a storage control unit to control the transfer of data between the host processor and one of the disk drive devices. A storage control unit converts a disk address specified in a command into a cache store address and checks to see if a copy of the data in the specified address is resident in the cache store. If a copy of the data is present in the cache store, the commanded operation (read or write) is executed with the storage control unit controlling the transfer of data between the host processor and the cache store. If a copy of the data is not present in the cache store and the commanded operation is a write operation then the storage control unit accesses the disk space specified by the address, controls transfer of the data from the disk to the cache store, and overlays it with the data from the host processor.

The cache store is managed by segments, each segment comprising many (for example 1792) data words. The segments that have been written to while resident in the cache store must be returned to the disks at their proper disk spaces if a permanent copy of the data is to be maintained. Furthermore, the transfer of written-to segments back to the disks must take place at fairly frequent intervals or the cache store will become filled with written-to segments, leaving no room for new segments if the host processor should command a write operation and a copy of the data from the specified disk space is not already resident in the segments of data in the cache store. One solution to this problem would be to halt further commands from the host processor while the contents of the cache store are returned to the disks. This is undesirable for two reasons. First, it would waste host processor time. Secondly, it is not desirable to empty the cache store because, statistically, the data from the most recently written-to segments in the cache store is likely to be used again and would soon have to be brought back into the cache store.

The present invention solves this problem by providing a method and apparatus for controlling the transfer of written-to segments from a cache store to disks without intervention by or delay of the host processor, and in such a manner that the most recently used written-to segments are not transferred.

SUMMARY OF THE INVENTION

An object of the present invention is to provide a subsystem for managing the transfer to a permanent store of segments of data which have been written to while resident in a cache memory, the subsystem being capable of managing such transfers independently of a host processor and in such a manner that there is always empty space in the cache store to receive and store new segments of data.

An object of the present invention is to provide a method and subsystem for managing segments of data in a cache store such that a segment does not have to be transferred to a disk at the time a new segment of data is written into the cache store.

An object of the present invention is to provide, in a data processing system including a disk drive device for driving a disk, a host processor for issuing commands calling for the transfer of data between the host processor and the disk drive device, a cache store for storing segments of data, and a storage control unit connected between the host processor, the cache store and the disk drive device for controlling transfers of data between the host processor, the cache store and the disk drive device in response to the command, the improvement comprising: storage means for storing a command queue and a segment descriptor table having an entry therein corresponding to each segment of data in the cache store, each of the entries including a written-to bit which is set if the corresponding segment has been written to while resident in the cache store; the command queue comprising a series of commands issued by the host processor to the storage control unit and waiting to be executed by the storage control unit to transfer data between the host processor and the disk drive device through the storage control unit; the storage control unit including first means connected to the storage means for searching the segment descriptor table for an entry wherein the written-to bit is set, second means, responsive to the first means when the first means locates an entry wherein the written-to bit is set, for forming a command directing the transfer of the segment of data corresponding to the located entry from the cache store to the disk drive device, third means for entering the formed command into the command queue; and, means for executing the formed command when the disk drive priority device is not busy, whereby the transfer of a written-to segment from the cache store to the disk drive device is accomplished without intervention by the host processor.

A further object of the invention is to provide a data processing system as described above wherein the storage control unit includes fourth means for checking the command queue for any commands queued therein, the fourth means inhibiting the first means hen a check of the command queue shows that a command is queued therein.

A further object of the invention is to provide a data processing system as described above and further comprising a second host processor and second storage control unit, and a plurality of disk drive devices, the host processors, the storage means, the cache store and the disk drive devices being connected to both of the storage control units whereby either of said storage control units may form a command directing the transfer of a segment of data from the cache store to one of said disk drive devices if the written-to bit in the segment descriptor table entry corresponding to that segment is set.

An object of the present invention is to provide a data processing system as described above wherein the command queue comprises a separate queue of commands for each of the disk drive devices.

Another object of the invention is to provide a method of operating a data processing system of the type including a disk drive device for driving a disk, a host processor for issuing commands calling for the transfer of data between the host processor and the disk drive device, a cache store for storing segments of data, storage means for storing global variables, and a storage control unit for controlling transfers of data between the host processor, the cache store and the disk drive device, a method for maintaining space in the cache store for receiving new segments of data without having to transfer a segment of data out of said cache store at the time the new segment of data is received, the method comprising: storing in storage means a queue of commands issued by the host processor and waiting to be executed by the storage control unit, storing in the storage means a segment descriptor table entry corresponding to each segment of data in the cache store, each entry being provided with a written-to bit to indicate whether or not the segment of data corresponding to the entry has been written to while resident in the cache store; searching the segment descriptor table for an entry wherein the written-to bit is set; forming a command directing the transfer of a segment of data to the disk drive device if the written-to bit in the corresponding entry is set; placing the formed command on the command queue; and, executing the formed command to transfer a segment of data from the cache store to the disk drive device.

An object of the present invention is to provide a method as described above wherein the searching of the segment descriptor table is inhibited if the storage control unit is receiving a command from the host processor or an interrupt signal from the disk drive device.

An object of the present invention is to provide a method as described above for use in a system having plural disk drive devices and a host processor for issuing commands including a disk drive device number and address identifying the disk drive device and disk space at which a permanent copy of the data addressed by the command resides, the method further including: storing in the storage means a separate command queue for each of the disk drive devices; entering into each segment descriptor table entry the disk drive device number identifying the disk drive device to which the corresponding segment of data in the cache store should be transferred; and, entering a formed command into the command queue corresponding to the device number in the segment descriptor table entry.

Other object of the invention and its mode of operation will become apparent upon consideration of the following description and the accompanying drawing.

BRIEF DESCRIPTION OF DRAWINGS

FIGS. 7a-7c comprise a flow diagram of a Check Trickle subroutine;

FIGS. 8a and 8b comprise a flow diagram of a Trickle Write routine; and,

FIG. 9 illustrates the format of a command queue header and a command queue entry.

DESCRIPTION OF A PREFERRED EMBODIMENT

Figure 2:
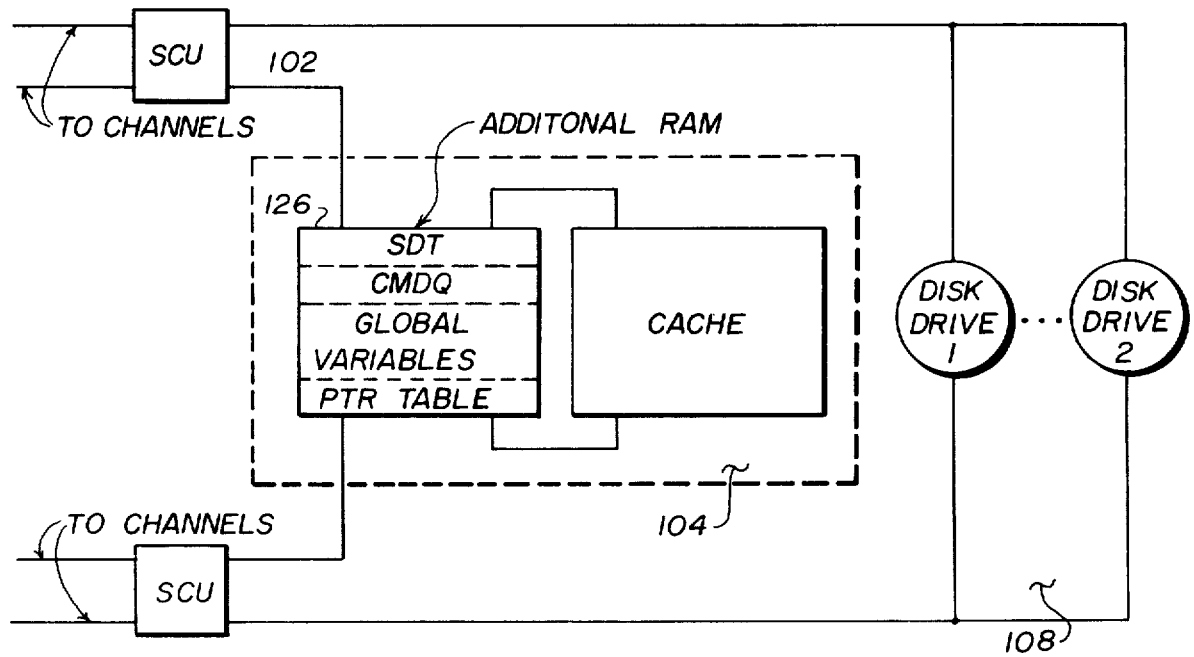
FIG. 2 shows a cache/disk subsystem.
Figure 3:
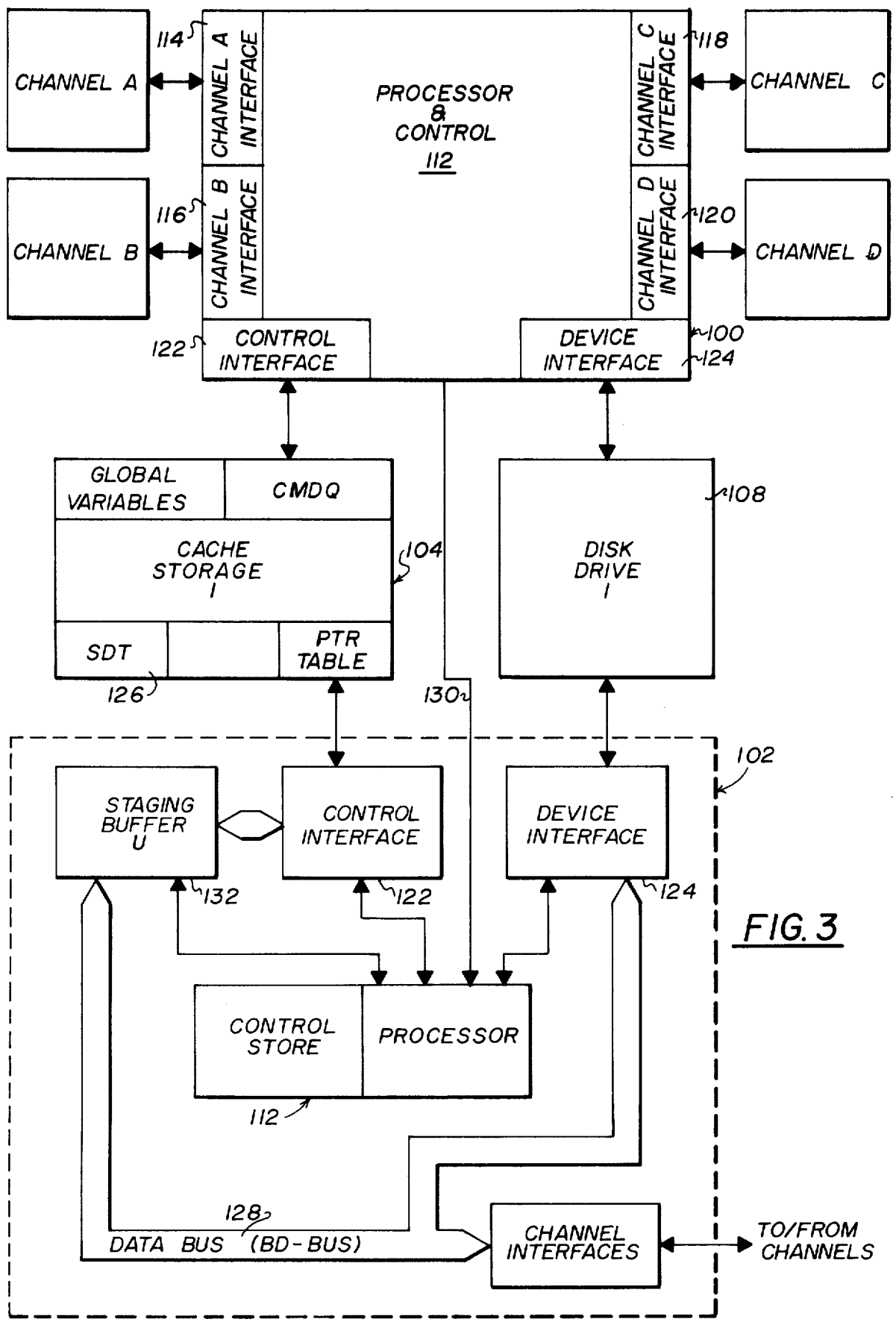
FIG. 3 shows a cache/disk subsystem in greater detail.

FIGS. 2 and 3 illustrate a data processing system as disclosed in the applicaton of Robert E. Swenson, Ser. No. 207,152 (Application A). The data processing system includes a cache/disk subsystem having at least one cache storage unit 104, a plurality of disk drive devices 108 for driving disks and one or more storage control units (SCUs) 100,102 for interfacing the cache storage unit with the disk drive devices and one or more host processors (not shown) the storage control unit being connected through channel units A-D to the host processors.

The cache storage unit has a cache store portion for storing segments of data, a segment being, for example 1792 words. The cache storage unit also includes a random access memory for storing a segment descriptor table (SDT), a pointer table, a command queue, and other various global variables which may be used by the SCUs in controlling transfers of data between the host processors, the cache store and the disk drive devices.

Figure 4:
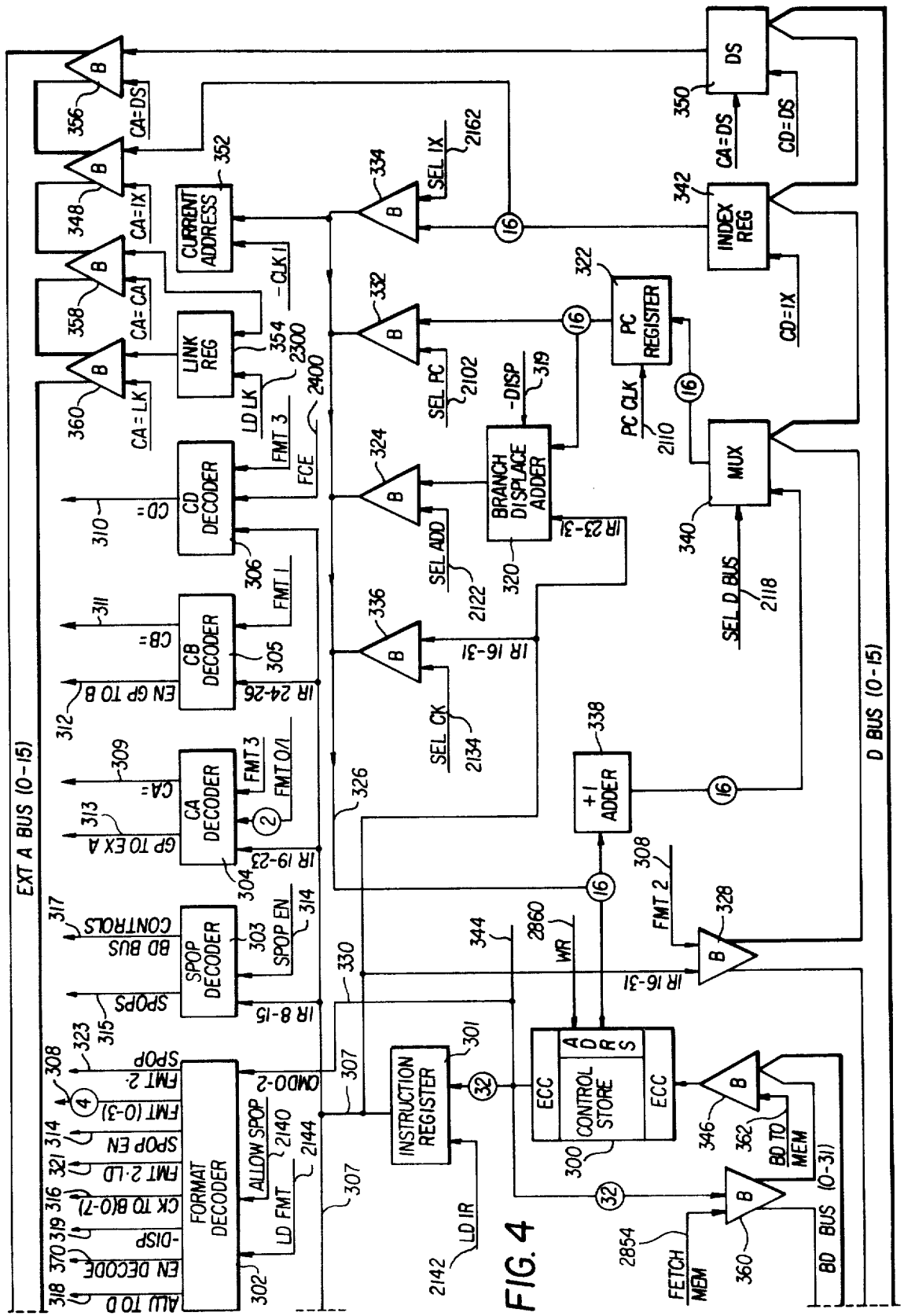
FIGS. 4 and 5 comprise a register level block diagram of some of the circuits in a storage control unit.
Figure 5:
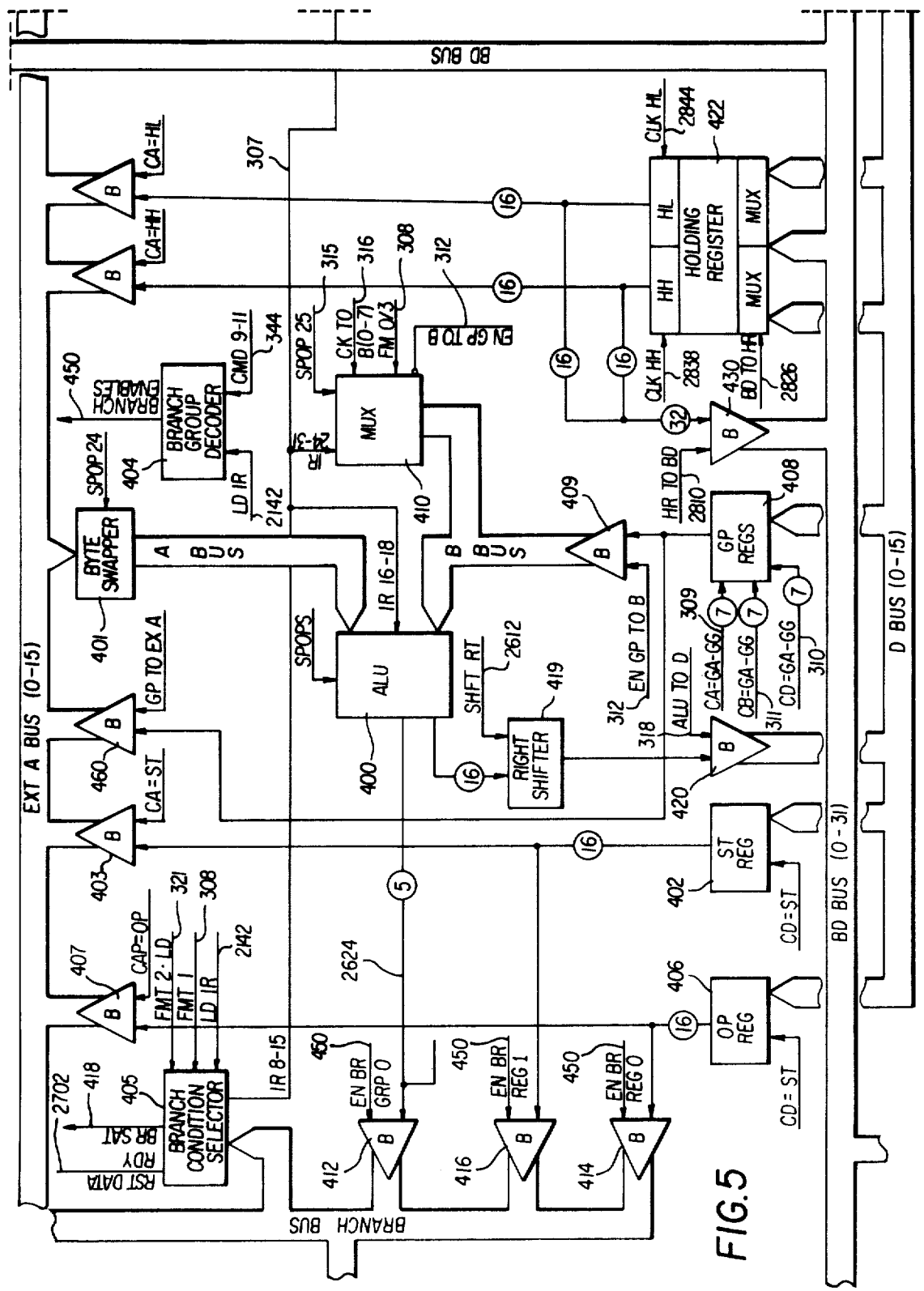
Figure 6:
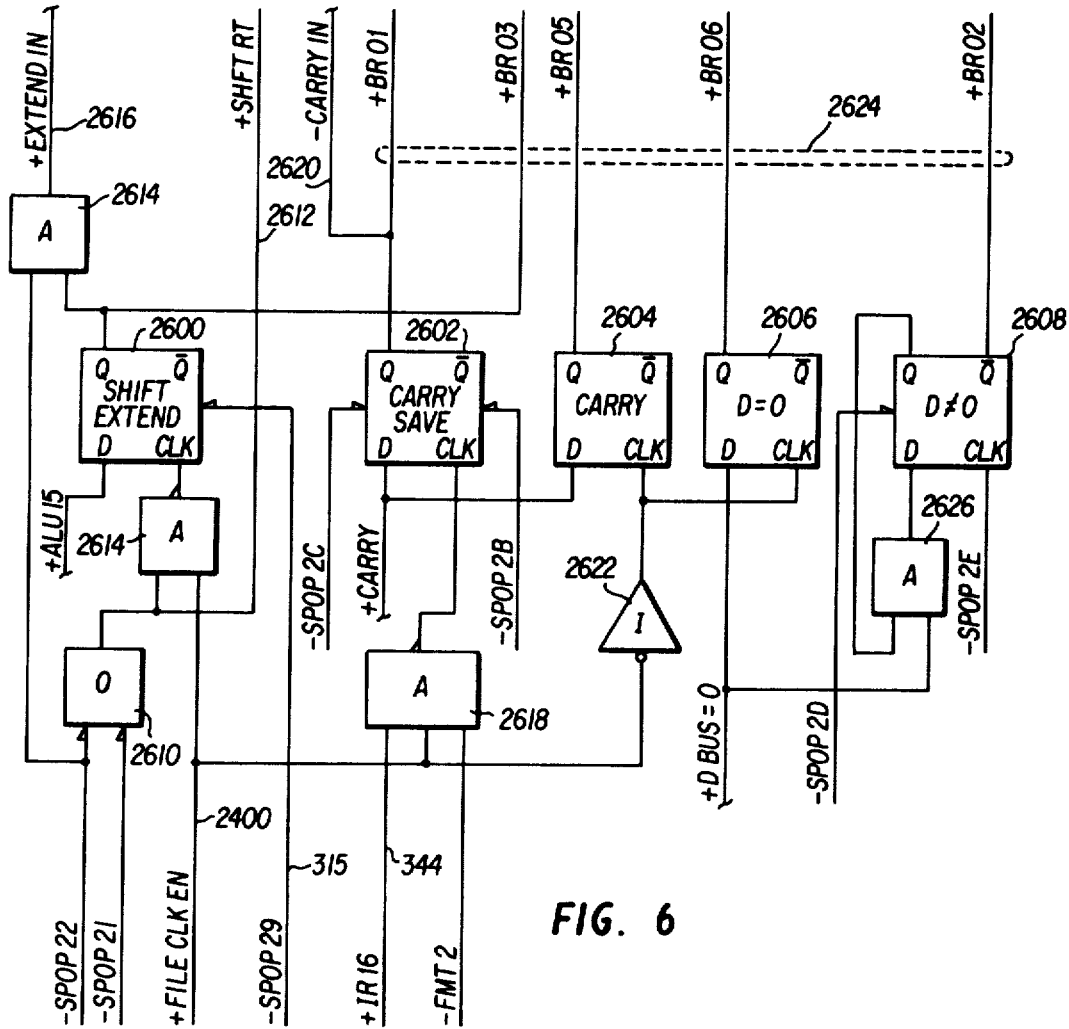
FIG. 6 is a logic circuit showing details of a portion of an ALU for producing certain branch condition signals.

As illustrated in the lower portion of FIG. 3, a storage control unit (SCU) includes a Staging Buffer 132, a control store 112 for storing data as well as the program for controlling a processor also located in the SCU. The control store is illustrated again in FIG. 4 (reference numeral 300) and FIGS. 4–6 show many of the registers and other circuits within the processor. The operation of these circuits is fully described in the above-referenced application (see description of FIGS. 3, 4 and 26 therein) and the circuits are shown in the present application for ease in following the program steps described below.

Referring to accompanying FIG. 3, one aspect of the system disclosed in Application A may be summarized as follows. When the host processor wishes to access data at a specified disk space it issues a command defining the operation to be performed (read or write). The command also specifies the address of the disk space at which the operation is to take place by defining the disk drive device number, the starting address and the number of words to be transferred.

Figure 1:
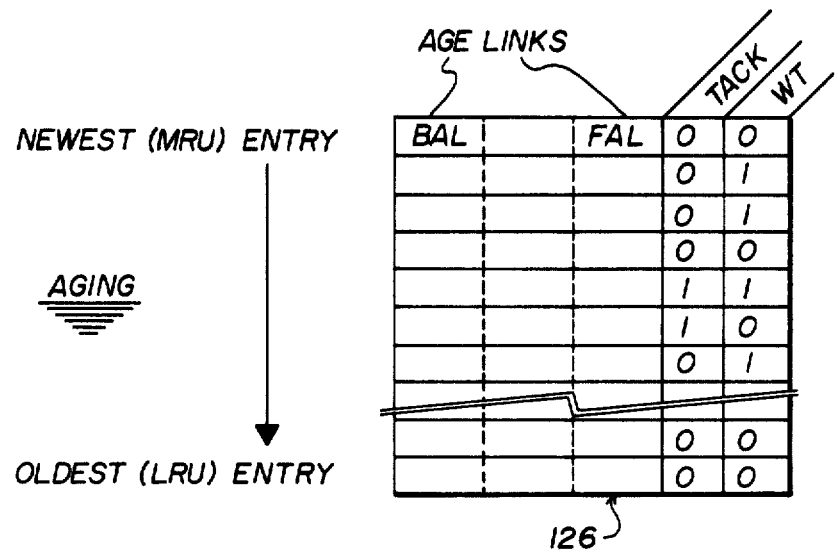
FIG. 1 illustrates a segment descriptor table and a part of the information contained in each entry.

Commands from the host processor are received and interpreted by the SCU which first checks a segment descriptor table SDT to see if a copy of the data from the specified disk space is resident in the cache store 104. The SDT has an entry therein for each segment of data in the cache store. The complete format of an SDT entry is shown in FIG. 16 of Applicaton A while FIG. 1 of the present application shows only part of the information contained in several SDT entries making up an SDT 126. The SDT is descirbed at pages 227-229 of Application A.

If the SCU finds that a copy of the data from the specified disk space is resident in the cache store, then it initiates the data transfer from/to the host processor to/from the cache store. If the transfer is from the host processor to the cache store, the SCU sets a "written-to"

(WT) bit in the SDT entry or entries corresponding to the segment or segments into which the data is written. The WT bit, when set, indicates that the data in the corresponding segment in cache store has never been written to its specified disk space.

If the SCU interprets a host processor command and finds that a copy of the data from the specified disk space is not resident in the cache store, and the disk drive device containing the specified disk space is busy, the SCU forms a command and places it in a command queue. There is one command queue for each disk drive device and each queue stores the commands waiting to be executed by its associated disk. The format of a command queue head word and a command queue entry is illustrated in FIG. 9. A complete description of a command queue is given in Applicaton A at pages 223-225.

When a queued command becomes the highest priority command in its queue, it is removed from the queue and executed to move into the SCU the segments of data containing the specified disk space. If the command is a write command, the data from the disk is overlayed with data from the host processor with the resulting data segments being entered into the cache store. An SDT entry is formed for the new segment and the WT bit is set because the disk does not contain a copy of the data now present in the new segment in cache store.

It will be noted that the foregoing summary makes no mention of transferring a segment of data from the cache store to a disk drive device to make room for a new segment. The reason for this is that the return of written-to segments from the cache store to the disk drive devices is completely independent of entry of new segments into the cache store. In accordance with the principles of the present invention "trickling" i.e. the return of written-to segments from the cache store to the disk drive devices is carried out under control of trickle commands which are formed by the SCU's and placed in the command queues where they are then executed

Check Trickle Subroutine

FIG. 67 of Application A illustrates an Idle Loop routine which an SCU executes when it is looking for work to do. During execution of the Idle Loop the SCU checks for an External Function (EF) tag from a host processor which indicates that the host processor is presenting a command to the SCU. If no EF is detected, the SCU checks to see if it is receiving an interrupt signal indicating that a disk drive device has completed a seek operation and is ready to transfer data. If no interrupt is detected then the SCU checks to see if any of the command queues contain a command waiting to be executed. If the SCU finds that there are no queued commands waiting to be executed then the SUC proceeds to execute the Check Trickle subroutine illustrated in accompanying FIGS. 7a-7c.

The purpose of the Check Trickle subroutine is to search the SDT to see if there is a segment of data resident in the cache store which has been written to and a copy thereof not returned to its disk space, and if such a segment is found, to form a trickle command and place it on the command queue for the disk drive device to which the copy of the written-to segment is to be written. After the Check Trickle subroutine is executed, the SCU checks to see if the segment is destined for a disk drive device having fixed heads. If it is, the SCU branches to the Trickle Write routine illustrated in FIGS. 8a and 8b to actually transfer the segment of data into its assigned disk space.

If the segment is not destined for a disk drive device having fixed heads then the SCU issues a seek start to the disk drive device and returns to the Idle Loop looking for more work to do. When the seek is complete, the disk drive device issues an interrupt which is detected when one of the SCU's executes the Idle Loop looking for work to do. At this time the SCU will execute the Trickle Write routine illustrated in FIGS. 8a and 8b to write the segment of data into its assigned disk space.

Figure 7A:
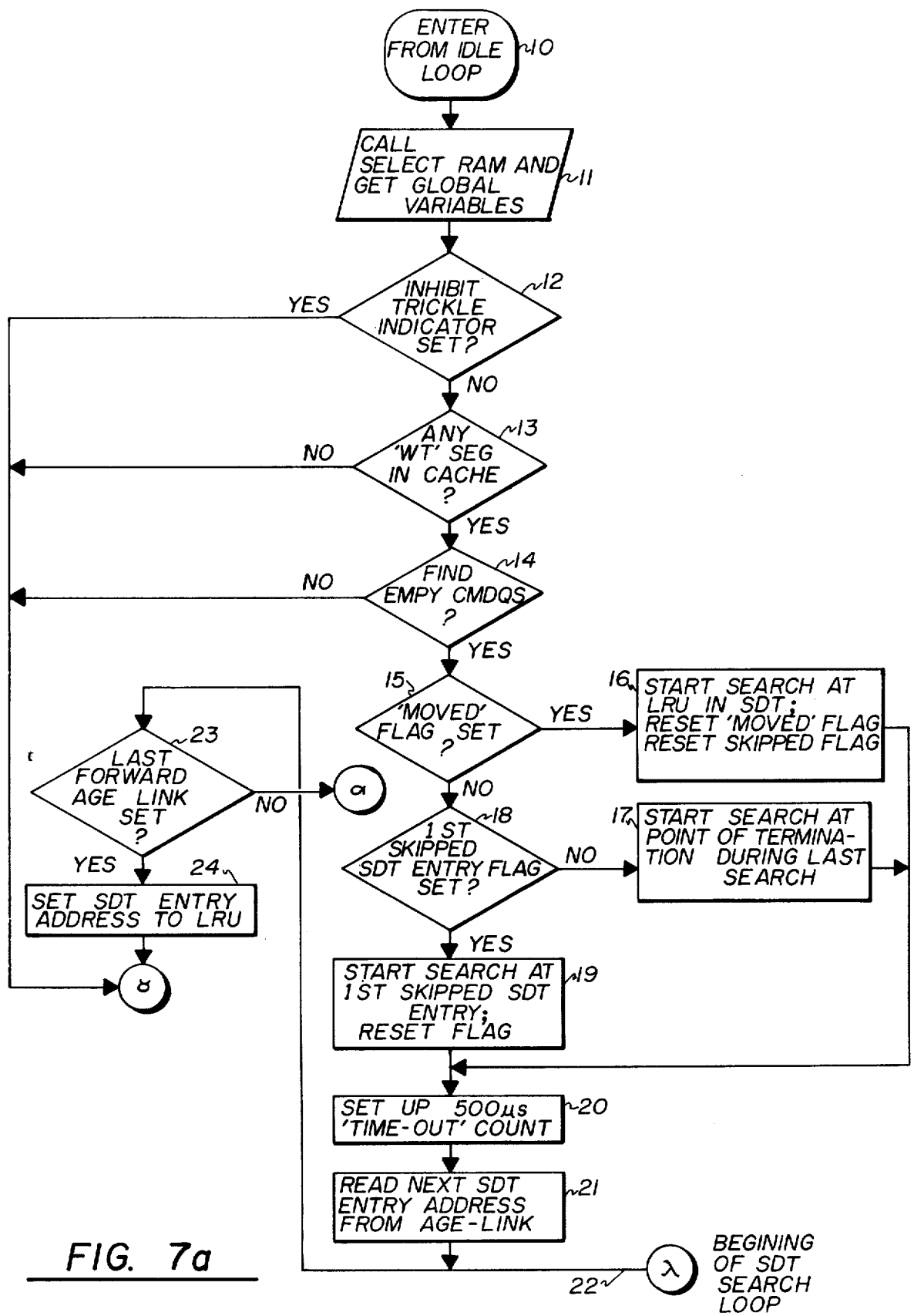

Referring now to the flow chart of FIG. 7a, the Check Trickle subroutine is entered at 10 by a call from the Idle Loop described above. At step 11, an intial sequence of control words selects (i.e. requests access to) the RAM portion of the cache storage unit 104 (FIG. 2) and obtains certain global variables necessary for the proper execution of the control word sequence used in accomplishing the "trickle" operation. The global variables, typically function as system-wide flags, counters, address pointers, etc. and are fetched into the Staging Buffer 132 (FIG. 3) for use. The Staging Buffer 132 comprises two 8K$b$ buffer units and a temporary storage area used in SCU operations.

Next, at decision point 12 (FIG. 7a), a global variable SBGSTA containing binary information representative of the current state of the subsystem is fetched from Staging Buffer 132 and tested to determine whether or not the subsystem is currently in a state that prohibits a "trickle" operation. In essence this global variable acts as an "inhibit trickle" indicator and is permanently assigned a specific location in the Staging Buffer 132.

The testing of the "inhibit trickle" indicator is accomplished by the following hardware operations precipitated through he execution of control words sequentially stored in Control Store 300 (FIG. 4). The control word formats are illustrated in FIGS. 14A-14D of Application A. First, the global variable address of SBGSTA is obtained from the CK field (bits 16-31) of the current control word, placed on the D Bus, and from there gated into a BX Register which serves as an address register for Staging Buffer 132. The next control word causes the contents of the BX Register to be placed on the address bus of Staging Buffer 132. The Staging Buffer 132 then outputs the contents of the addressed location onto the BD Bus and from there into the Holding Register (HR) 422 (FIG. 5). Next, a masking value of '8000' is obtained from the CK field of the next control word (IR bits 24-31) and is gated onto the high order bits (0-7) of the B Bus. Referring to FIG. 5, the contents of the high order bits (0-15) of HR 422, subsequently referred to as HH, are gated onto the EXT A Bus, and bits 0-7 are gated through the Byte Swapper 401, and onto the A Bus; the contents of the A Bus and the B Bus are logically ANDed by the ALU 400 and the results are gated onto the D Bus. As a result of this masking operation the D Bus will contain a non-zero value if an "inhibit trickle" condition is indicated. The next control word precipitates a conditional loading of PC 322 from the CK field of the control word depending on the contents of the D Bus. As explained in copending Application A, a detector circuit (not shown) monitors the D Bus and produces an output signal anytime the value on the D Bus is zero. As shown in accompanying FIG. 6, this signal is stored in a "D=ZERO" Latch 2606 and is used by the current control word to determine the condition of the D Bus. If the D Bus is non-zero then the PC 322 is loaded from the CK field and subsequent execution is vectored at decision point 12 (FIG. 7a) to a sequence of control words (represented at 50 and 51 in FIG. 7c) which temporarily terminates any further operations relating to the trickling process by returning the global variables to CSU 104 RAM and freeing (i.e. releasing control of) the RAM. The Trickle Check routine then branches to the Idle Loop routine to look for other work to do.

If the contents of the D=ZERO Latch 2606 indicate that the value on the D Bus is zero then PC 322 (FIG. 4) is not loaded with the value from the CK field of the control word, but instead is incremented by one and the next sequential control word stored in control store 300 is executed in the normal fashion. Thus, referring to FIG. 7a, an eventual return to the execution of idle loop operations occurs from decision point 12 if the "inhibit trickle" indicator was found to be set. Consequently, the execution of control words is continually vectored to the idle loop in this manner until the contents of the global variable SBGSTA are changed. However, if the subsystem is currently in a state which permits the trickling of data, then no branching will occur, the PC is incremented in the normal fashion and the next sequence of control words stored in control store 300 is executed.

The next sequence of operations as represented by decision point 13 of FIG. 7a, determines whether or not there are any segments currently residing in cache that have been written to by the host processor and a copy thereof and yet transferred to a disk and hence are eligible candidates for trickling. A global variable (SBGWTS) stored in a specific location in Staging Buffer 132 contains a count of the number of segments that have been written to.

First, the address of SBGWTS is obtained from the CK field of the current control word and placed on the D Bus. The input to the BX Register from the D Bus is simultaneously gated thereby loading BX with the address of the variable. Next, BX addresses Staging Buffer 132 and the buffer responds by placing the contents of that location on the BD Bus. Referring again to FIG. 5, the BD Bus is then gated to HR Register 422. The HR Register 422 now contains the current count of WT segments in cache. Realistically the count only occupies the lower half of a 32-bit word (i.e. 16 bits). Therefor, only the lower half (bits 16-31) need be considered. This being the case, the lower half of HR 422, subsequently referred to as HL, is then placed on the D Bus. This is accomplished by gating the contents of HL through the Byte Swapper 401 and subsequently through the ALU to the D Bus with no ALU operations performed in the interim.

Next, a branching decision is made depending upon the current value of the D Bus. If the D Bus is zero (meaning there are no WT segments in cache) the PC is loaded from the CK field of a control word thus causing a branch in the execution sequence. In this instance, the CK field of the control word specifying the conditional branch contains the address of the control word sequence represented at 50 and 51 in FIG. 7c which will, once again, cause the return of all global variables to RAM, the release of RAM, and an exit to the Idle Loop. If the D Bus is non-zero (meaning there are WT segments in cache) then branching does not occur, the PC is incremented by one, and the sequential execution of control words proceeds in the normal fashion.

Referring to FIG. 7a, the next few control words, repesented by decision point 14, check to see if there is at least one empty command queue to prepare for a trickle operation. A specific address in the Staging Buffer 132 holds a global variable SBGMTQ that is used as an indicator for command queue availability. This location will be filled with all "ones" if all command queues are unavailable. In other words, each bit location, 0-15, represents a command queue with a command queued on it if the bit is a 1, and represents an empty queue if the bit is a zero.

First, the BX Register is loaded with the address of SBGMTQ from the CK field in a manner previously described. Then, the contents of this address are fetched from the Staging Buffer 132 to HR 422, and more specifically to HL. The next control word causes the addition of a "one" to the contents of the HL Register. Referring to FIG. 5, the contents of HL are then gated onto the A Bus through the byte swapper 401, the value "one" is gated onto the B Bus from the CK field, and the ALU 400 decodes and performs an addition operation as specified by bits 16-18 of the control word. If the HL Register already contained an indication meaning there are no empty CMDQs available then the addition of a one by the ALU will force a carry operation. As described in the copending application, the occurrence of an ALU carry operation forces the setting of a Carry Latch 2604 (FIG. 6) which outputs its contents to a specific bit on the Branch Bus. The contents of the Branch Bus are typically used during the execution of a control word requiring a conditional branch. The next control word loads the PC from its CK field only if the Carry Latch 2604 is non-zero, otherwise the execution sequence of control words continues as normal. If the Carry Latch 2604 was non-zero, this implies there are currently no empty command queues and the loading of the PC from the CK field causes a branching of the execution sequence to the previously discussed sequence of control words represented at 50 and 51 in FIG. 7c which return the global vairables, release RAM, and exit to the Idle Loop.

At decision point 15 in FIG. 7a, a global variable (SBGMVD) containing a bit used as a MOVED flag is examined and a branching of the control word execution sequence is performed depending on its contents. The MOVED flag acts as an indicator which when set signifies that various age links in the SDT entries have been recently changed. An "age link" in an SDT entry is simply a relative address pointing to another SDT entry that is either the next older or next younger entry according to its frequency of use. For a complete description of the contents and function of the SDT entries, see copending application Ser. No. 207,152, particularly the description of FIG. 16 therein. Since the age links determine the order in which segments must be trickled, any change in their contents will necessarily require that a search through the SDT entries for possible trickle candidates (i.e. WT segments) beginning with the least recently used (LRU) segment. Typically, the MOVED flag has been set before the very first search through the SDT since, in this case, the age links have just been created. This assures that the very first search through the SDT entires will begin with the LRU.

SBGMVD is fetched from Staging Buffer 132 and stored in HR 422. The lower half, which contains the MOVED flag bit, is placed on the D Bus and tested by the next control word. If the contents of the D Bus are non-zero, indicating that the MOVED flag bit has been set, then the PC 322 is loaded from the CK field and a branch is made to a sequence of control words represented at block 16 in FIG. 7a.

The sequence of control words represented at block 16 performs the following operations: first, the MOVED flag is reset by storing a zero in its staging buffer location. Next, a relative SDT address of the entry used to describe the least recently used (LRU) segment is stored at the staging buffer location reserved for SBGSAT. The global variable SBGSAT represents the current age link (or relative address) to the next SDT entry to be used in checking for a "WT" condition. Finally, a global variable SBGTSK is cleared and reset to zero. The global variable SBGTSK normally contains a relative SDT address of the first of any WT segments skipped by previous trickling operations because the disk device to which the segment would be sent is already busy. However, the high order bit (bit 0) of SBGTSK is also used as a SKIPPED flag as subsequently explained. At this point, the sequential execution of control words represented at block 20 continues with the initializing of a TIME-OUT counter as subsequently explained.

If the test at decision point 15 indicates that the MOVED flag is not set (meaning no change in SDT age-links) then branching does not occur and the next set of control words to be executed, represented at decision point 18, tests for previously skipped segments. A skipping of the destaging of a segment occurs if at some time during the trickling of WT segments all available command queues become filled. Then, as subsequently described, the high order bit of SBGTSK in Staging Buffer 132 is set and the relative SDT entry address for this segment is saved for trickling at a later time. The testing of the SKIPPED flag is accomplished by an ALU "AND" operation with a masking word followed by a conditional D Bus branch. If this test indicates that no segments have been skipped then, as indicated at 17, the search of SDT entries begins at the point of termination during the last search which corresponds to the "age link" saved in the staging buffer location reserved for SBGSAT, but first a branch is made to the sequence of control words which creates a TIME-OUT count as indicated in block 20. If, however, the test at decision point 18 indicates that the SKIPPED flag is set, the next sequence of control words represented at block 19 insures that the search of SDT entries for WT segments begins with the first previously skipped SDT entry. First, the SKIPPED flag is reset to zero. Next, the remainder of SBGSAT, which contains the relative SDT entry address of the first previously skipped SDT entry, is stored in the staging buffer location reserved for it. Thus, an iterative searching of SDT entries for trickle candidates is subsequently begun with the entry corresponding to the relative address found in the global variable.

Before a searching of the SDT entries is begun, a TIME-OUT counter is initialized as indicated in block 20. The TIME-OUT counter comprises a pair of locations in control store 300 which maintain a current count of the number of SDT search iterations to be completed before returning to the idle loop to check for interrupts. The initial value of the counter is judiciously selected so that the SCU 104 RAM and interrupts are locked out for no longer than about 500 μs. This value, however, is somewhat arbitrary and can be loaded to the control store as part of the microcode so as to maximize the efficiency and to meet the specific demands of any particular cache/disk subsystem. As subsequently described, during each SDT search iteration an SDT entry is checked for a WT segment and trickled if possible. If a trickle is not possible or allowable for that entry then the TIME-OUT counter is decremented by one before the next iteration is begun.

The next sequence of control words, represented at block 21, reads SBGSAT into HR 422 to be used during the subsequent SDT search iteration. As previously explained, this location contains the "age link" (or relative SDT entry address) of the next entry to be checked for a WT condition. Additionally, the high order bit of this location also acts as a LAST FORWARD AGE-LINK (LFAL) flag which, if set, signifies that the entry represents the most recently used (MRU) segment.

As indicated at 22, the SDT search iterations begin at this point. Consequently, the following sequences of control words constitute a loop in the execution sequence that searches through the SDT for possible segments to trickle by checking each SDT entry to see if its WT bit is set. Each iteration of the loop takes approximately 22.0 μs during which one SDT entry is checked and several tests are performed. These tests include checking for "External Function" (EF) and disk interrupts, and a LAST FORWARD AGE-LINK set condition. If any of these conditions are found to be true, the search is terminated and an exit is taken to the Idle Loop.

The first sequence of control words within the SDT search loop, as indicated at decision point 23, begins with the testing of the LFAL bit. An ALU AND operation with a bit mask is used to determine if it is set and a conditional branch is performed on the results. If the LFAL bit is found to be set, then, as indicated at block 24, the relative address of the SDT entry representing the LRU segment is placed in the staging buffer location for SBGSAT to prepare for the next search, and the trickle operation is terminated by returning to the Idle Loop after first executing the steps shown in blocks 50 and 51. If LFAL is not set, a branch occurs and, as indicated in block 25 (FIG. 7b), the next sequence of control words causes the actual SDT entry to be moved from CSU 104 RAM to the staging buffer.

First, the contents of the staging buffer location reserved for the current SDT entry's relative address SBGSAT are saved in a temporary storage area in the Control Store 300. Next, the base address of an SDT entry storage area in Staging Buffer 132 and a word transfer length count of four (there are four words in an SDT entry) are set up in the GB and GC registers. The SDT entry's relative address is added to this base address and a branch is made to a GET/PUT RAM subroutine. The subroutine uses registers GB and GC to control the transfer of the four words comprising the next (first) SDT entry for checking from the CSU 104 RAM to the Staging Buffer 132.

Figure 7B:
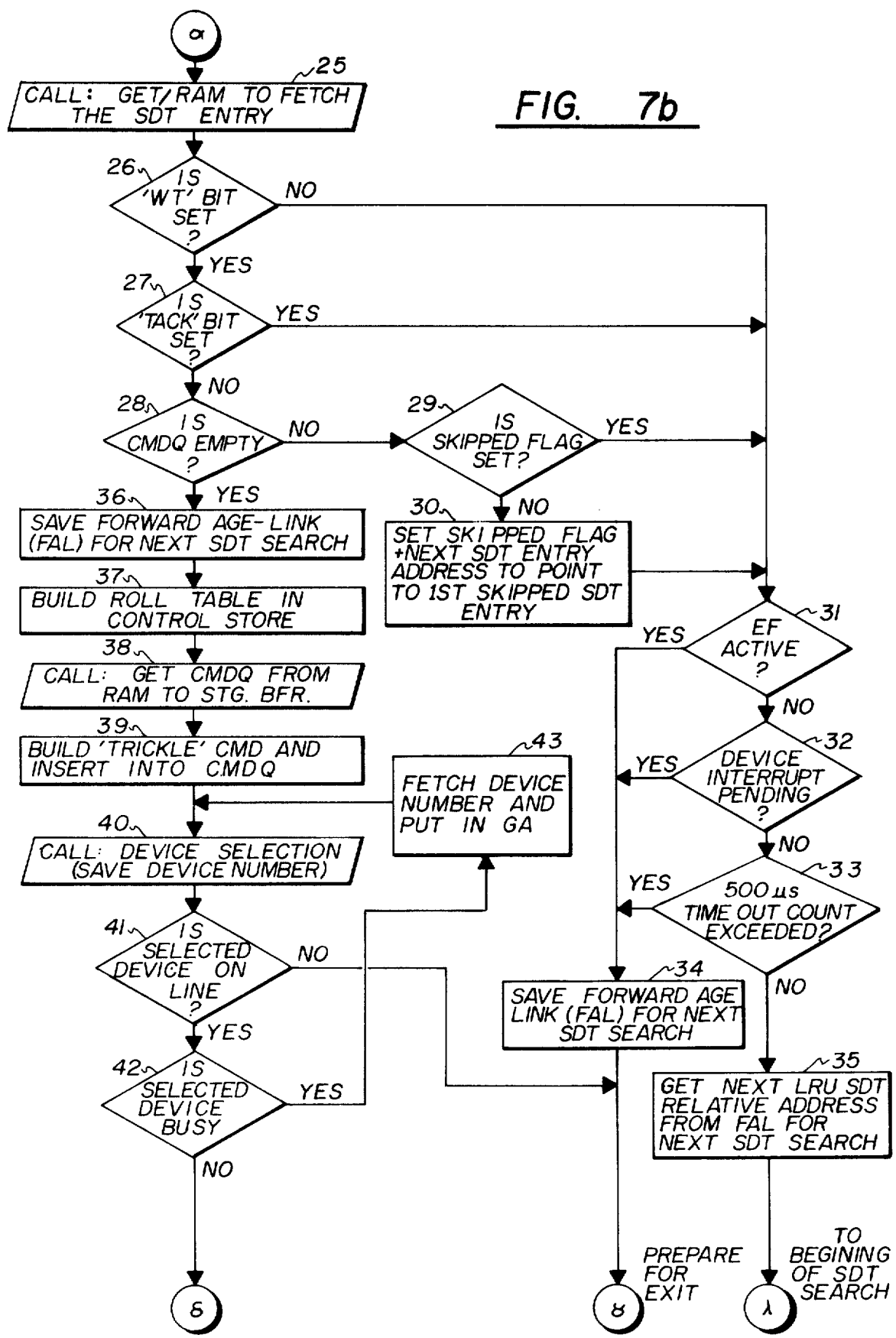

With the SDT entry now in the Staging Buffer 132, the next sequence of control words tests a WT bit and a TACK flag bit contained in the second word of the entry by a typical masking operation followed by a conditional branching. Referring now to FIG. 7b, if the WT bit tested at decision point 26 is not set or the TACK flag tested at decision point 27 is set, then this SDT entry represents a segment which is not an eligible trickle candidate and a branch is made to the end of the SDT search loop represented by decision point 31. The TACK flag is typically set, when necessary, by a separate earlier control sequence to indicate that the segment in cache associated with that entry will be used shortly and must not be destroyed.

Assuming the WT bit is set and the TACK flag is zero, the next sequence of control words at decision point 28 will allow the actual destaging for this segment to start if the command queue for the disk drive device to which this segment is to be sent is available. First, the HOST ID contained in the first word of the SDT entry currently in Staging Buffer 132 is saved in a temporary storage space in Control Store 300. Next, the disk drive device number, which is also contained in the first word of the SDT entry, is then converted into a "Bit-Significant Device Address" (BSDA). In this form each bit (0–15) of the BSDA represents one of the 16 possible disk devices capable of being used with the cache/disk subsystem. The BSDA is then saved in a permanent storage area in Control Store 300 to be used at a later time as subsequently described. Finally, the global variable SBGMTQ in the staging buffer, which contains a bit significant count of the available command queues, is checked to determine if the command queue for the disk drive device to which the segment is to be sent is empty (i.e. available). This is accomplished by an ALU operation where SBGMTQ is ANDed with the BSDA, followed by a conditional branch operation. If at decision point 28 the command queue for the disk drive device is not empty, a branch is taken to a group of control words represented by decision points 29 and 30 that will set the previously discussed SKIPPED flag and store the relative address of this current SDT entry in the remainder of the SKIPPED flag word for use in trickling at a later time.

At this point, the end of the SDT search loop has been reached and one iteration has been completed. Therefore, the next sequence of control words represented by decision points 31 and 32 proceeds to check for External Function (EF) active and disk interrupt pending conditions before beginning another iteration. First, the EF flag bit is tested using a conditional branch. Next, a separate control word sequence is called upon to check for the interrupts and the results are put into the GA Register. If either one of these conditions is found to exist, a branch is made to a sequence of control words represented by block 34 that saves the FORWARD AGE-LINK in the staging buffer location SBGSAT for use during the next SDT search. From here, the trickle check operations are terminated in order to process the interrupts. The operations depicted in block 50 (FIG. 7c) are executed and the Check Trickle subroutine exits to the Idle Loop.

Referring now to decision point 33, if no interrupt conditions are found to exist, the TIME-OUT counter is decremented and tested for zero to determine if the allotted search time (approximately 500 µs) has been exceeded. If it has been exceeded a branch is made to block 34 and the trickle check operations are terminated as before. If the count is not zero, the next LRU SDT Relative Address is obtained from the FORWARD AGE-LINK field in the third word of the SDT entry and a branch is made back to the beginning of the search loop as indicated at point 22 in FIG. 7a.

Referring again to decision point 28 in FIG. 7b, if the command queue for the disk drive device is empty it means that all tests necessary for the transfer of the segment to the disk have been passed. The FORWARD AGE-LINK obtained from the third word of the SDT entry is saved in staging buffer location SBGSAT as indicated in block 36. Next, the actual trickle or transfer of the written-to segment from the cache store to the disk drive device is initiated by a sequence of control words which accomplish the following: a roll table is built, a command for the destage is inserted into the CMDQ and a SEEK command is issued to the disk drive followed by an exit to the Idle Loop.

First, as represented in block 37, a Roll Table Entry is built by setting both the SVLD and OCCUPIED field bits and by storing the segment's SDT entry address in the SEGADR field of one word in a roll table store in a reserved space in Control Store 300. A roll table is typically associated with a specific disc drive device. The roll table eliminates the need to search the SDT a second time to determine the source and destination of each segment once data transfer begins. For a more detailed description and explanation of the roll table see FIG. 18 of Application A.

As indicated in block 38, after the roll table entry is built, a call is made to a Get/Put Command Queue subroutine which fetches the empty command queue for the disk drive device from CSU 104 RAM to the Staging Buffer 132. Next, a sequence of control words represented by block 39 builds a two-word trickle command (see FIG. 9) and inserts it as an entry in the empty command queue. This is done one word at a time by setting up the proper field and bit values in the HR register and then storing the HR contents in the proper command queue entry locations in the staging buffer. A copy of the trickle command is also saved in the control store.

During the building of the trickle command, the disk drive device number is obtained and held in the GA register. The next sequence of control words, indicated at 40, saves the device number in control store 300 and initiates a call to a Device Selection subroutine which selects (i.e. requests the use of) the desired disk drive device. This routine returns to the Trickle Check subroutine with the status of that disk drive device in the GA Register. The register is tested, as represented by decision points 41 and 42, using ALU AND operations with various masks to determine first, if the disk drive device selected is currently "on line" and second, if the device is busy. If the device is found not to be on line, the trickle operation is terminated by putting the global variables back in the RAM (block 50) and exiting to the Idle Loop. If the disk drive device selected is found to be currently busy, a branch is made at decision point 42 to a sequence of control words represented at 43 that restores the device number in the GA register and once again calls the Device Selection subroutine at 40. The drive is continually reselected in this manner until it is no longer busy or is no longer on line.

Assuming the desired disk drive device is on line and not busy, the program continues in FIG. 7c where, at step 44 a call is made to a Seek Start subroutine (see FIGS. 91A and 91B of Application A) which issues SEEK START and SET SECTOR commands to the selected disk drive device and sets the DEVICE BUSY flag in the command queue header word for the device. Additionally, a flag is set (STC=1) before calling the subroutine to indicate to the subroutine that the Segment Device Relative Address (SDRA) in the trickle command must be converted to a Cylinder-Head-Record-Sector Address as is needed for the Seek Start subroutine. This is ultimately accomplished through a series of ALU division operations. Upon returning from the Seek Start subroutine, the sequence of control words indicated at 45 causes a branch to a subroutine which transfers the roll table previously created in Staging Buffer 132 into CSU 104 RAM. Once the newly created roll table entry is stored in CSU 104 RAM and a return is made to the Check Trickle subroutine, a test of a status bit flag is made as indicated at decision point 47, to determine if a fixed head disk drive device has been selected. If a fixed head device has been selected, then a branch at decision point 47 is immediately made to a Trickle Write subroutine (FIG. 8*a*) since there is no need to wait for the disk drive device to position its head prior to writing the segment onto the disk. If not, the previously selected drive is deselected before continuing.

If the selected disk drive device does not have fixed heads then the storage control unit prepares to look for other work while the disk drive device positions its head for writing the segment onto the disk. At block 48 the storage control unit puts the Bit Significant Device Address (BSDA) for the disk seek just started, into the global variable at the staging buffer location reserved for SBGMTQ. This global variable acts as an empty queue parameter used at decision point 28. This is followed by a call as shown in block 49 to a Get/Put Command Queue subroutine which stores the newly built command queue entry presently residing in Staging Buffer 132 back into CSU 104 RAM.

Upon returning from the Get/Put Command Queue subroutine the Get/Put Global Variables subroutine is called at step 50 to store all of the global variables back in CSU 104 RAM.

Next, a ROLRAM flag in the status word RECVST (at control store location '3F26') is set to indicate that the roll table is now in CSU 104 RAM. At this point the Trickle Check subroutine is complete and an exit is made to the Idle Loop routine.

TRICKLE WRITE ROUTINE

Prior to calling the Trickle Write routine illustrated in FIGS. 8*a* and 8*b*, the Check Trickle subroutine has accomplished at least the following: (1) found a written-to segment to transfer from the cache store to a disk drive device; (2) formed a trickle command and entered it on the command queue for the disk drive device to which the segment is to be sent; (3) built a roll table entry; and (4) started a Disk Seek. Typically, the Trickle Write routine is invoked by the Process Interrupt routine (FIGS. 75A–75D of Application A) after the disk seen has been completed, the drive and SDT have been selected, and the command queue has been brought into the Staging Buffer 132. However, the Trickle Write routine may also be called by the Check Trickle subroutine if the test at decision point 47 (FIG. 7*c*) indicates that a "fixed head" disk drive device was selected.

Basically, the Trickle Write routine oversees and controls the transfer of segments from the cache store to a disk device based on the roll table. It resets the WT bit in the SDT entry of every segment transferred to the disk device and decreases a parameter CDGWTS representing the total number of written-to segments resident in the cache store. It also deletes the associated command queue entry before finally exiting to the Idle Loop.

There are no explicit inputs to the Trickle Write routine, but implicit inputs include the device number in the control store at a specific location STSXDA, the command queue in the Staging Buffer 132, a valid roll table in CSU 104 RAM, and an SDT with all segments formed.

Referring now to FIG. 8*a*, the Trickle Write routine is entered at 52 from the Idle Loop or the Check Trickle subroutine. On entry into the Trickle Write routine the initial sequence of control words, represented at block 53, causes the first command of the command queue entry to be moved from the Staging Buffer 132 to locations CMDQ 1 and CMDQ 2 in the control store. The EF 2 bit in CMDQ1 is set to indicate a Cache Seek. This is followed by a sequence of control words represented at blocks 54 and 55 which sets the Active CMD Request Number in the second header word of the command queue to zero and then subsequently calls the Get/Put Command Queue subroutine to put the command queue back in CSU 104 RAM.

After the command queue is returned to the RAM, a call is made to the Get/Put Roll Table subroutine represented at block 56 which gets the roll table from CSU 104 RAM and stores it in Staging Buffer 132.

On return from this routine the next group of control words, as indicated in block 57, transfers the roll table word-by-word from Staging Buffer 132 to Control Store 300. The roll table size is stored in the GB register and a fetch-and-store loop is set up. The value in the GB register is decremented each iteration and tested with a conditional branch. If GB is not zero, a branch back to the fetch and store operation occurs at decision point 58. The transfer is complete when the value in GB is zero. The loop is then exited and the next sequence of control words represented by block 59 is executed.

At block 59, the global variables are saved by storing them in CSU 104 RAM and releasing the RAM. At this point, a call is made to Cache To Disk Control subroutine represented at block 60. This routine transfers whole segments of data between CSU 104 and one of the disk drive devices 108. The transfers are first made from CSU 104 to Staging Buffer 132 and then from the Staging Buffer to the disk drive device.

After the transfer of the written-to segment is completed, a test is made at decision point 69 to see if register GA contains an error code or else indicates that the transfer was completed without an error. If GA contains an error code, the RAM is selected at block 63, a Delete Command Queue Entry subroutine is executed to delete the trickle command from the command queue, and upon return from this routine an exit is taken to an error recovery routine.

If the test at decision point 69 indicates that the segment was transferred to the disk device without error, the program proceeds to block 61 where the Get/Put Global Variables subroutine is called to move the global variables from the RAM into the Staging Buffer 132. At block 62 a subroutine is called to update the SDT by setting the WT bit to zero in the table entry corresponding to the segment transferred to the disk device.

At block 63 a call is made to the Get/Put Command Queue subroutine to move the command queue for the disk device from the RAM to the Staging Buffer 132 and at block 64 the Delete Command Queue Entry subroutine is called to delete the Trickle Write command from the command queue.

After deleting the Trickle Write command from the command queue, the Device Busy flag bit in the command queue header word is reset by an ALU AND operation with a mask word as represented by block 65. Finally, as indicated in blocks 66 and 67, the Get/Put Command Queue and Get/Put Global Variables subroutines are called to store the command queue and the global variables back in CSU 104 RAM and to release the RAM. At this point the Trickle Write routine is completed and an exit is made to the Idle Loop.

While the invention has been particularly shown and described with reference to a preferred embodiment thereof, it will be understood by those skilled in the art that various changes in form and detail may be made therein without departing from the spirit and scope of the invention as defined by the appended claims.

The embodiments of the invention in which an exclusive property or privilege are claimed are defined as follows:

1. In a data processing system including a disk drive device for driving a disk, a host processor for issuing commands calling for the transfer of data between said host processor and said disk drive device, a cache store for storing segments of data, and a storage control unit connected between said host processor, said cache store and said disk drive device for controlling transfers of data between said host processor, said cache store and said disk drive device in response to said command, the improvement comprising:

storage means for storing a command queue and a segment descriptor table,
said table having an entry therein corresponding to each segment of data in said cache store, each of said entries including a written-to bit which is set if the corresponding segment has been written to while resident in said cache store;
said command queue comprising a series of commands issued by said host processor to said storage control unit and waiting to be executed by said storage control unit to transfer data between said host processor and said disk drive device through said storage control unit;

said storage control unit including,
first means connected to said storage means for searching said segment descriptor table for an entry wherein said written-to bit is set,
second means, responsive to said first means when said first means locates an entry wherein said written-to bit is set, for forming a command directing the transfer of the segment of data corresponding to said located entry from said cache store to said disk drive device,
third means for entering said formed command into said command queue; and,
means responsive to said command queue for executing said formed command when said disk drive device is not busy,
whereby the transfer of said written-to segment from said cache store to said disk drive device is accomplished without intervention by said host processor.

2. A data processing system as claimed in claim 1 wherein said disk drive device has fixed heads for recording and said means for executing said formed command comprises means for immediately executing said formed command if disk drive device is not busy.

3. A data processing system as claimed in claim 1 wherein said disk drive device has movable heads,
said storage control unit having means responsive to said formed command for issuing a seek to said disk drive device to position said heads,
said storage control unit having means for accepting further commands from said host processor and placing them in said command queue if said disk drive device is busy.

4. A data processing system as claimed in claim 1 wherein said storage control unit includes fourth means for checking said command queue for any commands queued therein, said fourth means inhibiting said first means when a check of said command queue shows that a command is queued therein.

5. A data processing system as claimed in claim 1 or claim 4 and further comprising a second host processor and second storage control unit, and a plurality of disk drive devices, said host processors, said storage means, said cache store and said disk drive devices being connected to both of said storage control units whereby either of said storage control units may form a command directing the transfer of a segment of data from the cache store to one of said disk drive devices if the written-to bit in the segment descriptor table entry corresponding to that segment is set.

6. A data processing system as claimed in claim 5 wherein each entry in said segment descriptor table has a tack bit for indicating whether or not the segment of data corresponding to the segment descriptor table entry should remain in said cache store;
and means responsive to said tack bit when it is set for inhibiting said second means.

7. A data processing system as claimed in claim 5 wherein said command queue comprises a separate queue of commands for each of said disk drive devices.

8. In a data processing system including a disk drive device for driving a disk, a host processor for issuing commands calling for the transfer of data between said host processor and said disk drive devices, a cache store for storing segments of data, storage means for storing global variables, and a storage control unit for controlling transfers of data between said host processor, said cache store and said disk drive devices, a method for maintaining space in said cache store for receiving new segments of data without having to transfer a segment of data out of said cache store at the time said new segment of data is received, said method comprising:

storing in storage means a queue of commands issued by said host processor and waiting to be executed by said storage control unit,
storing in said storage means a segment descriptor table entry corresponding to each segment of data in said cache store, each said entry being provided with a written-to bit to indicate whether or not the segment of data corresponding to said entry has been written to while resident in said cache store;
searching said segment descriptor table for an entry wherein said written-to bit is set;
forming a command directing the transfer of a segment of data to said disk drive device if the written-to bit in the corresponding entry is set;
placing said formed command on said command queue; and,
executing said formed command to transfer a segment of data from said cache store to said disk drive device when said storage control unit is not otherwise busy.

9. A method as claimed in claim 8 wherein the searching of said segment descriptor table is inhibited if said storage control unit is receiving a command from said host processor or an interrupt signal from said disk drive device.

10. A method as claimed in claim 8 for use in a system having plural disk drive devices and a host processor for issuing a command including a disk drive device number and address identifying the disk drive device and disk space at which a permanent copy of the data addressed by the command resides, said method further including:

storing in said storage means a separate command queue for each of said disk drive devices;

entering into each said segment descriptor table entry the disk drive device number identifying the disk drive device to which the corresponding segment of data in the cache store should be transferred; and, entering a formed command into the command queue corresponding to the device number in said segment descriptor table entry.

* * * * *